United States Patent [19]

Oelbermann

[11] Patent Number: 5,110,467
[45] Date of Patent: May 5, 1992

[54] FILTER PRESS

[76] Inventor: Max Oelbermann, Wilhelm-Engels-Str. 1, 5630 Remscheid, Fed. Rep. of Germany

[21] Appl. No.: 593,807

[22] Filed: Oct. 5, 1990

[30] Foreign Application Priority Data

Oct. 10, 1989 [DE] Fed. Rep. of Germany ....... 3933740

[51] Int. Cl.$^5$ ............................................. B01D 25/34
[52] U.S. Cl. ..................................... 210/225; 210/230
[58] Field of Search ................. 210/225, 230; 100/198, 100/199

[56] References Cited

U.S. PATENT DOCUMENTS

| | | | |
|---|---|---|---|
| 4,082,663 | 4/1978 | Sato | 210/739 |
| 4,558,641 | 12/1985 | Nakamura | 210/225 |
| 4,900,436 | 2/1990 | Iwatani | 210/225 |

FOREIGN PATENT DOCUMENTS

| | | |
|---|---|---|
| 225972 | 6/1987 | European Pat. Off. . |
| 1813792 | 5/1970 | Fed. Rep. of Germany . |
| 2923864 | 12/1980 | Fed. Rep. of Germany . |
| 3608774 | 9/1987 | Fed. Rep. of Germany . |
| 1207105 | 8/1989 | Japan ................................. 210/225 |

Primary Examiner—W. Gary Jones
Assistant Examiner—Matthew O. Savage
Attorney, Agent, or Firm—Antonelli, Terry, Stout & Kraus

[57] ABSTRACT

A filter press including a filter plate set suspended on top guide rails wherein the filter plates are covered on both sides with filter cloths, and with a plate-conveying slide movable along the guide rails. A vibrating device for shaking the filter cloths in order to eject the filter cakes is arranged on the plate-conveying slide, with shaking motion of the vibrating device being oriented predominantly perpendicularly to the filter cloth plane.

7 Claims, 3 Drawing Sheets

FILTER PRESS

FIELD OF THE INVENTION

The invention relates to a filter press with a filter plate set suspended on top guide rails wherein the filter plates are covered on both sides with filter cloths, and with a plate-conveying slide movable along the guide rails.

BACKGROUND OF THE INVENTION

Such filter presses have been known, for example, from German Patent 2,923,864. By the plate-conveying slide, the filter plates are pulled in succession off the filter plate set in order to eject the filter cakes so that the filter cake chambers in the respectively separated plates are opened up for cake ejection. Since the filter cakes in many cases adhere strongly to the filter cloths, it is known to provide such filter presses with means for scraping off the filter cake as described for example, in DOS 3,608,774. However, the use of such scraper means delays the operation of the filter press, and, depending on the filter cake material, the scraper can also lead to an undesirable fouling of the filter cloths with solids.

It is known from U.S. Pat. No. 4,082,663 to suspend the filter cloths on rods and subject the ends of the filter rods, laterally projecting beyond the filter cloths, to jarring impacts by means of a vibrator. These jarring impacts, however, are oriented substantially in parallel to the filter cloth plane and, consequently the vibrating motion fades as early as in the upper zone of the filter cloths and, in contrast, hardly any detachment of an adhering filter cake can be effected in the lower zone of the filter cloths. Additionally, the vibrators therein are arranged on separate, external guide rails of the filter press, and relatively expensive regulating devices are provided therein, in order to orient the vibrators in each case to the filter cloths of the filter plate that has been segregated for filter cake ejection.

SUMMARY OF THE INVENTION

The invention is based on the object of providing the filter press of the type discussed above with a device for enhancing filter cake ejection which operates very efficiently and is to be distinguished by low production expense and compact structure.

The filter press according to this invention is characterized by a vibrating device arranged on the plate-conveying slide for shaking the filter cloths in order to eject filter cakes wherein the shaking motion is oriented predominantly perpendicularly to the filter cloth plane. A number of advantages are attained by the invention. First of all, it was found that it is possible, due to the shaking motion oriented essentially at right angles to the filter cloth plane, to shake off any adhering filter cake material very effectively from the filter cloth, this shaking-off effect covering the entire filter cloth surface since, in this invention, the filter cloth, due to the jarring impacts, is in each case made taut again jolt-like over the entire surface. This mode of operation thus differs basically from the mode of operation according to aforementioned U.S. Pat. No. 4,082,663 where the vibration impacts act on the upper filter cloth rim in the direction of the filter cloth plane and thus, with each impact, the tensioning of the filter cloth is diminished. Furthermore, the advantage is obtained that, by the arrangement of the vibrating device on the plate-conveying slide, a correct alignment of the vibrating device onto the filter cloths prepared at that point in time for filter cake ejection is automatically achieved. Consequently, separate control and positioning means are unnecessary. Moreover, the vibrating device can be integrated, in case of the type of filter press under discussion, into the plate-conveying slide without requiring additional space.

In a further development of the invention, the provision can be made that the filter cloths are attached at the top respectively on rods; and that in each filter plate the two filter cloth rods are loosely supported on the end side via pivoting levers on an axle extending at a spacing above the top rim of the filter plate, this axle being attached to the filter plate suspension. As a result, in case of the filter plate which is, in each instance, separated for cake ejection, the two filter cloths can be swung against spring force away from the filter plate into an inclined position. This further development also includes that the vibrating device exhibits adjusting cylinders arranged on the plate-conveying slide and being oriented in their operating position respectively to an end of a double lever pivotably supported on the axle, with this double lever carrying on its other end in each case one of the filter cloth rods. The adjusting cylinders bring about, along the first portion of their downward piston movement, initially an inclined positioning of the filter cloths, and thereafter they can shake the filter cloths with brief and rapidly successive strokes. Consequently, the adjusting cylinders perform a dual task in this mode of operation. On the one hand, they effect an inclined positioning of the filter cloths whereby the filter cake ejection is already enhanced, and, on the other hand, they execute a vibratory shaking motion on the obliquely positioned filter cloths in order to detach, for example, any filter cake residues that may still adhere in isolated patches from the filter cloth. According to an alternative mode of operation, the adjusting cylinders can, in each case, execute their full stroke in rapid repetition so that the filter cloths experience a wide-ranging shaking motion.

According to further features of the invention, the provision can be made that the pivoting lever pairs arranged on both ends of the filter cloth rods are stressed by a tension spring arranged therebetween in the direction toward the filter plate in such a way that the upper filter cloth rims, with the filter plate set being closed, are in each case wrapped with tension inwardly around the upper corners of the filter plate. These measures ensure that the shaking motion can be exerted predominantly with a motion component directed perpendicularly to the filter cloth plane. For the filter cloths initially become slack during the inclined positioning to the extent that the upper filter cake rim is bent in the basic position across the filter plate, before they are tensioned again with a jerk at the end of the shaking impact, so that any adhering filter cake material is flung away.

In accordance with further advantageous features of the present invention, the lever arm ratio of the double levers is approximately 1:2-3, wherein the longer lever arm carries the filter cloth rods.

Advantageously, according to the present invention, the double levers are convexly curved toward the adjusting cylinders and the longer lever arm is oriented almost perpendicularly in the basic position.

The adjusting cylinders may, in accordance with the present invention, be arranged above the plate-entraining means on the slide and encompass between, with their piston rods, the plate-entraining means. The double levers are respectively located close to the center of the filter plates on an axle.

The filter plates and the slide are, respectively, movably arranged on lower inner legs of two parallel I-shaped guide rails, with the two adjusting cylinders being located essentially in a space defined by the two I-shaped guide rails.

BRIEF DESCRIPTION OF THE DRAWINGS

The invention will be described in greater detail below with reference to an embodiment illustrated in the drawings wherein.

DETAILED DESCRIPTION

Figure 1:
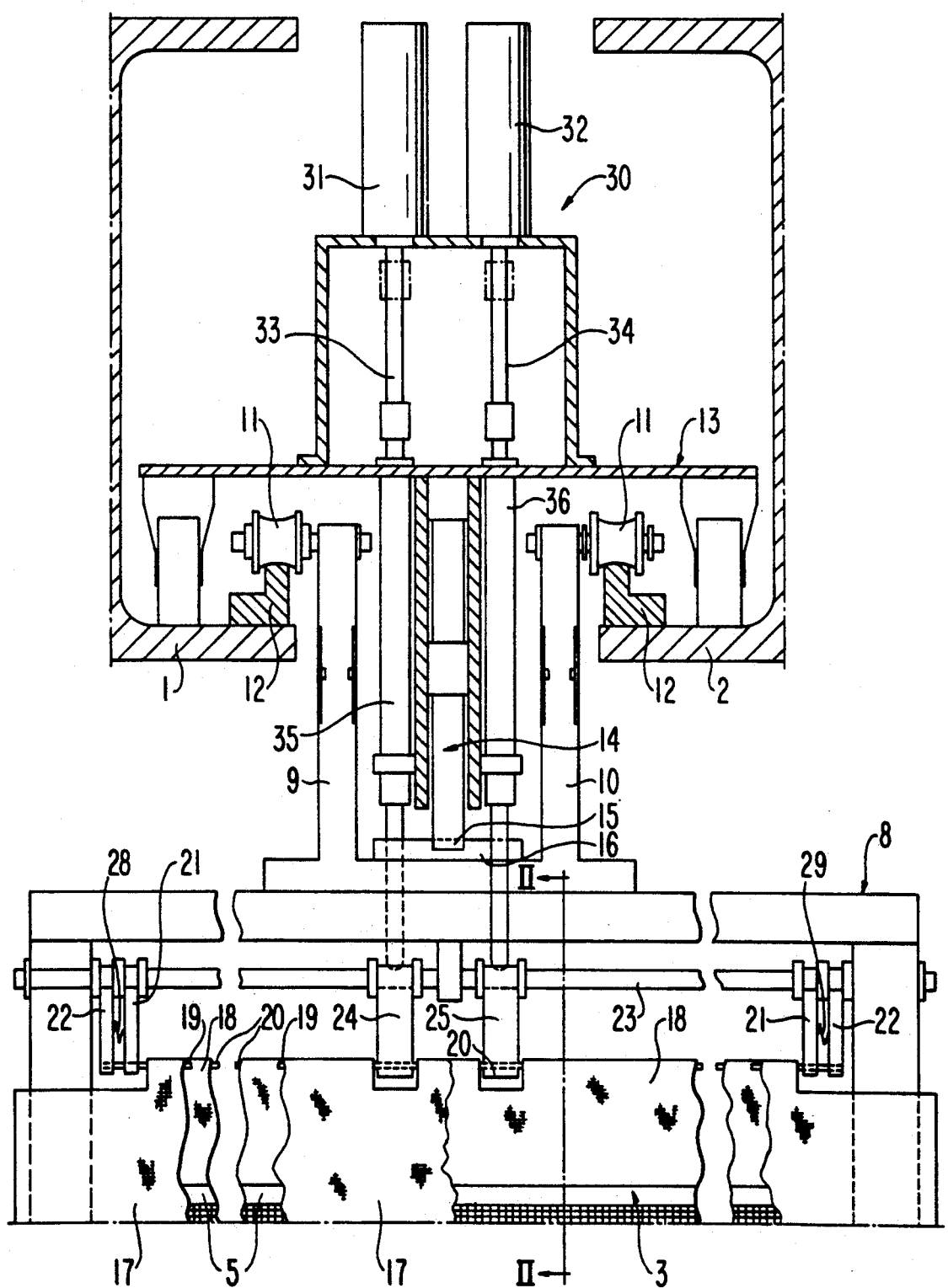
FIG. 1 shows a partial cross section through a filter press according to the invention.

A plurality of filter plates 3 are movably suspended on two I-guide rails 1, 2 extending over the length of the filter press; however, for the purpose of clarity only one filter plate is shown in the drawings with its upper zone. The filter plates 3 in each case include a supporting plate 5 provided with a recess, a so-called filter panel 4, a press diaphragm 6 being clamped in place by a frame 7 on the planar side of the supporting plate 5. At the top, a suspension yoke 8 having, in total, an approximately U-shaped configuration is attached to the lateral ends of the filter plate 3. Two upwardly extending suspension arms 9, 10 are mounted to the suspension yoke 8 and carry casters 11 running on special guide profiles 12, with the guide profiles 12 in turn, being arranged on the lower inner legs of the I-guide rails 1, 2. Furthermore, a plate-conveying slide 13 is displaceably supported on these lower inner legs of the rails 1, 2, with this slide 13 carrying a controllable plate-entraining means 14. The plate-entraining means 14 engages, with a driving lug 15 that can be controlled in the upward and downward directions, at a central yoke section 16 of the filter plate 3 to be transported in a particular case. The structure and mode of operation of such a plate-entraining means 14 are described, for example, in German Patent 2,923,864.

Figure 3:
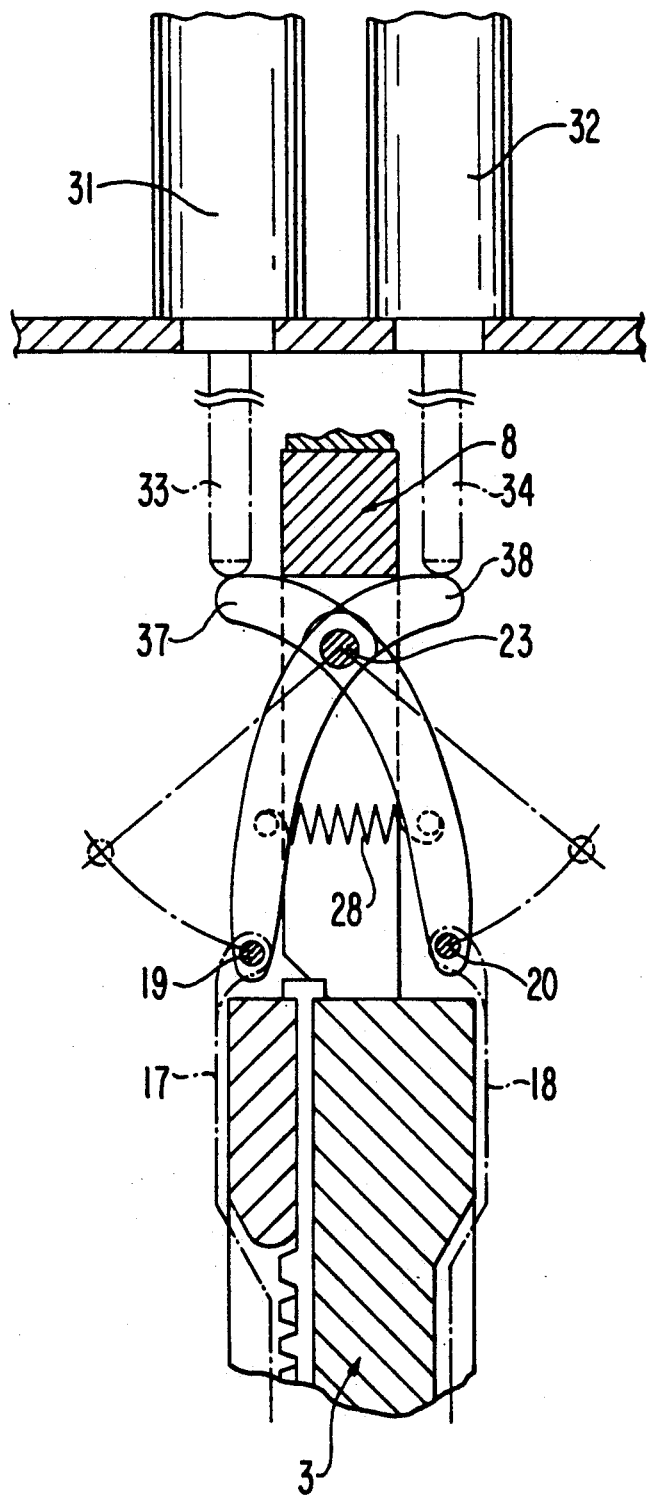
FIG. 3 is a view analogous to FIG. 2, but with the vibrating device being shown in the basic position.

The filter plates 3 are covered on both sides with respectively one filter cloth 17, 18. For this purpose, the filter cloths are equipped with loops at the top engaged by respectively one filter cloth rod 19, 20. These rods 19, 20 are loosely supported on the end side via pivoting levers 21 and 22, respectively, on an axle 23 extending at a spacing above the top rim of the filter plate 3. The axle 23, in turn, is supported in the transverse legs of the U-shaped suspension yoke 8 of the plate suspension. In the central zone, two double levers 24, 25 are arranged side-by-side on this axle 23, with the double levers being curved in convex fashion toward the top and their lever arm ratio is about 1:2.5. The longer lever 24,25 arms 26, 27 of the double levers carry on their ends the filter cloth rods 19, 20. The two double levers 24, 25 are arranged symmetrically to the vertical plane of symmetry of the filter plate extending through the axle 23. The shorter arm of the double levers 24, 25 is oriented almost perpendicularly in the basic position when the piston means 33, 34 are fully retracted as shown in FIG. 3.

Figure 2:
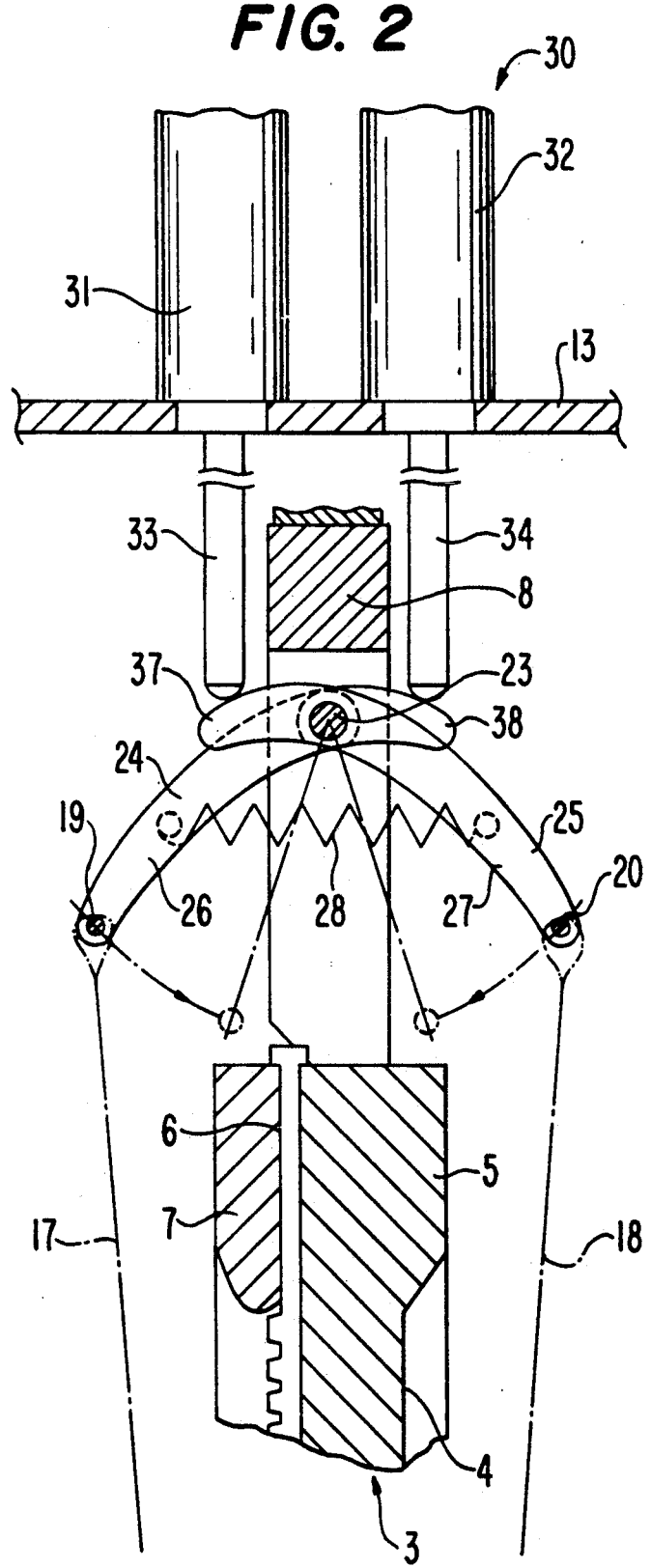
FIG. 2 shows a sectional view taken along the line II—II in FIG. 1 for explaining the vibrating device of the filter press which is in the shaking position.

The lateral pivoting levers 21, 22 exhibit the same shape as the longer lever arms 26, 27 of the central double levers 24, 25, and, for this reason, they are obscured in FIGS. 2 and, 3. On each filter plate side, between the pair of pivoting levers 21, 22, respectively, one tension spring 28 is fixed in place. In the basic position of FIG. 3, the tension springs 28 pull the filter cloth rods 19, 20 a marked distance further inwardly past the upper corners of the filter plate 3 so that at least the loop zone of the filter cloths is bent in an inward direction.

A vibrating device 30 is arranged on the conveying slide 13 and comprises two hydraulic or pneumatic adjusting cylinders 31, 32, the piston rods 33, 34 of which are oriented downwardly and project, encompassing the plate-entraining means 24, through guide tubes 35, 36 and extend, in the unextended position, approximately to the lower ends of the tubes 35, 36, thus being located shortly above the entraining yoke 16. The piston rods 33, 34 are in each case oriented toward the short lever arms 37, 38 of the double levers 24, 25, as indicated in dot-dash lines in FIG. 3. With an extension of the piston rods 33, 34, the piston rods 33, 34 impinge upon the short lever arms 37, 38 and swing the double levers 24, 27 together with the filter cloth rods 19, 20 into the position shown in FIG. 2 wherein the filter cloths 17, 18 are pulled into an inclined position away from the filter plate 3 and are tensioned again.

As can be seen from FIG. 1, the vibrating device 30 is accommodated in the space that is occupied anyway by the two I-guide rails 1, 2 and is structurally integrated into the plate-conveying unit.

In the illustrated embodiment, respectively one filter plate 3, covered on both sides with filter cloths 17, 18, is followed in succession within the filter plate set by an intermediate plate 5, 6, 7 which is otherwise identical but is not covered with filter cloths.

I claim:

1. A filter press comprising:
a pair of top guide rails;
a plurality of filter plates movably suspended along said top guide rails;
filter cloths provided on opposite sides of each respective said filter plate;
plate-conveying slide means movable along said top guide rails for moving a selected one of said filter plates along said guide rails, and
vibrating means arranged on the plate conveying slide means for imparting a shaking motion to a top edge of a selected one of said filter cloths to enable filter cake ejection therefrom.

2. A filter press comprising:
a pair of top guide rails;
a plurality of filter plates movably suspended on said top guide rails;
filter cloths provided on opposite sides of each respective said filter plate, said filter cloths being respectively attached, at top portions thereof, on filter cloth rods;
each said filter plate including a filter plate suspension means for suspending the filter plate in the filter press;
an axle mounted on each said suspension means at a position above a top rim of the respective filter plates:

a pair of pivoting levers pivotally mounted on said axle and having the lower ends attached to a respective filter cloth rod;

spring means interposed between the pair of pivoting levers in such a manner that, for cake ejection, the respective filter cloths can be swung against a spring force of said spring means away from the filter plate into an inclined position;

a pair of double levers pivotally supported on said axle, each of said double levers including a first end and a second end, the pivot point of said double levers being located between said first and second ends, said second end of each of said double levers having a respective said filter cloth rod mounted thereon; and means for vibrating said double levers including a pair of adjusting cylinder-piston means arranged in such a manner that a piston of the respective cylinder-piston means engages the first end of a respective said double lever.

3. A filter press according to claim 2, wherein said pairs of pivoting levers are arranged on opposite ends of the filter cloth rods, said pair of pivoting levers being configured such that when said spring means urges said pair of pivoting levers in a direction toward the filter plate, that an upper portion of the respective filter cloths, with the plurality of filter plates being located in a closed position, are in each case wrapped with tension inwardly around upper corners of the filter plate.

4. A filter press according to claims 2 or 3 wherein a lever arm ratio of the distance between said first end and the pivot point to the distance between the second end and the pivot point is about 1:2 to 1:3.

5. A filter press according to claim 4, wherein the double levers are convexly curved toward the respective adjusting cylinder-piston means, and wherein the shorter lever arm of the respective double levers is disposed substantially perpendicularly to the respective piston means in a fully retracted position of the adjusting cylinder-piston means.

6. A filter press according to claim 3 further comprising a plate conveying slide movably mounted on said pair of top guide rails, means for entraining the filter plates arranged on the plate conveying slide, wherein said adjusting cylinder-piston means are arranged on the plate-conveying slide at a position above the plate-entraining means with piston rods of the respective cylinder-piston means being disposed on respective sides of the plate-entraining means, and wherein the double levers are respectively located near a longitudinal center of the axle.

7. A filter press according to claim 6, further comprising a pair of substantially I-shaped guide rail means disposed in parallel for guiding a movement of the plate conveying slide, and wherein the two adjusting cylinder-piston means are disposed substantially in a space defined between the pair of I-shaped guide rail means.

* * * * *